(12) United States Patent
Lu et al.

(10) Patent No.: US 10,042,803 B2
(45) Date of Patent: Aug. 7, 2018

(54) OPERATING METHOD FOR CARD READER

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 33 days.

(21) Appl. No.: 15/122,460

(22) PCT Filed: Mar. 26, 2015

(86) PCT No.: PCT/CN2015/075096
§ 371 (c)(1),
(2) Date: Aug. 30, 2016

(87) PCT Pub. No.: WO2015/161729
PCT Pub. Date: Oct. 29, 2015

(65) Prior Publication Data
US 2017/0075839 A1    Mar. 16, 2017

(30) Foreign Application Priority Data

Apr. 21, 2014 (CN) .......................... 2014 1 0160209

(51) Int. Cl.
*G06F 13/20*    (2006.01)
*G06F 13/38*    (2006.01)
(Continued)

(52) U.S. Cl.
CPC ............ *G06F 13/385* (2013.01); *G06F 13/24* (2013.01); *G06F 13/38* (2013.01); *G06F 13/4282* (2013.01); *G06K 7/04* (2013.01)

(58) Field of Classification Search
None
See application file for complete search history.

(56) References Cited

U.S. PATENT DOCUMENTS 9,832,636 B2 * 11/2017 Meng ...................... H04W 8/22
2002/0040412 A1 * 4/2002 Estakhri ................ G06F 13/387
710/11

(Continued)

*Primary Examiner* — Elias Mamo
(74) *Attorney, Agent, or Firm* — Hammer & Associates, P.C.

(57) ABSTRACT

An operating method for a card reader, comprising: powering on a card reader, and setting an operating mode according to the type of a device connected thereto; judging the operating mode, waiting to receive audio data if the operating mode is an audio mode, converting the received audio data into a digital signal, forming a data packet by the digital signal, parsing the data packet to obtain a parsing result, judging an instruction type according to the parsing result, executing a corresponding operation according to the instruction type, converting the obtained operation result into an audio data packet, and sending the audio data packet to the device connected thereto; and waiting to receive USB data if the operating mode is a USB mode, judging an instruction type of the received USB data, executing a corresponding operation according to the instruction type, and returning the operation result to the device connected thereto. According to the present invention, a card reader conducts data communication with a device through an audio module or a USB module, thereby not depending on the USB module in the existing card reader to conduct data communication any longer, having relatively good compatibility, and improving the user experience.

20 Claims, 8 Drawing Sheets

(51) Int. Cl.
    *G06F 13/24*       (2006.01)
    *G06F 13/42*       (2006.01)
    *G06K 7/04*        (2006.01)

(56) References Cited

U.S. PATENT DOCUMENTS

| | | | |
|---|---|---|---|
| 2009/0248981 A1* | 10/2009 | Okabayashi | G06F 13/385 |
| | | | 711/115 |
| 2013/0254574 A1* | 9/2013 | Zacchio | H04W 52/0229 |
| | | | 713/323 |
| 2013/0304942 A1* | 11/2013 | Golembeski | G06F 13/385 |
| | | | 710/14 |
| 2015/0161418 A1 | 6/2015 | Ishikawa et al. | |

\* cited by examiner

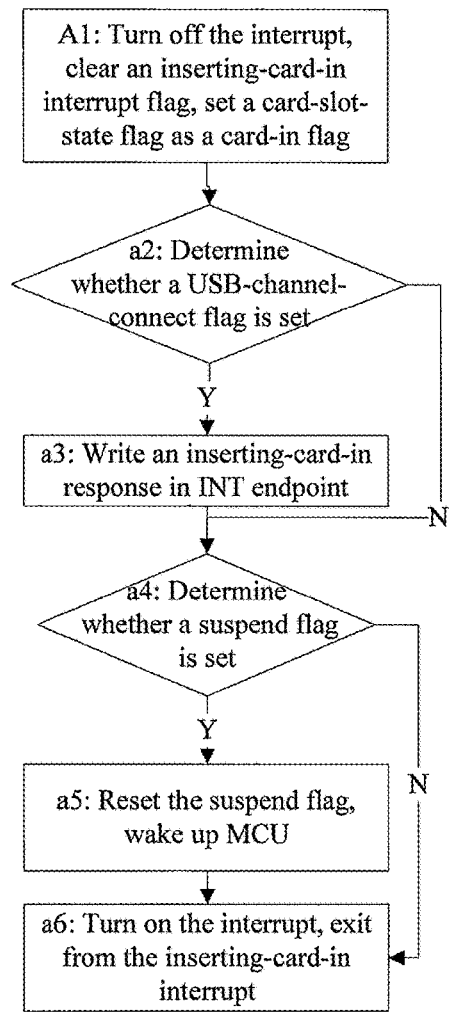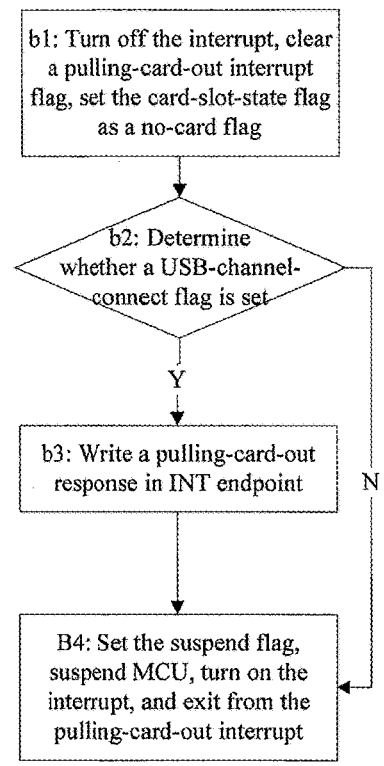
Fig. 2
Fig. 3

OPERATING METHOD FOR CARD READER

FIELD OF THE INVENTION

The present invention relates to a working method of a card reader, which belongs to field of communication.

PRIOR ART

At present, communication facilities, such as smart phones and tablets, are becoming more and more popular. However, most of the communication facilities do not have a main interface, or specifications of USB interfaces of the communication facilities are not unified, thus, data communication between a card reader and a communication device is limited.

SUMMARY OF THE INVENTION

The object of the invention is to provide a working method of a card reader, in which data communication does not still rely on a USB module in the card reader, and the method makes the data communication more compatible and more convenient for users.

Therefore, according to one aspect of the present invention, there provides a working method of a card reader, which includes:

Step S1, powering on and initializing a card reader, and setting a work mode according to a type of a device which connects to the card reader;

Step S2, determining the work mode, waiting for receiving audio data in the case that the work mode is an audio mode, and executing Step S3 when the audio data is received; waiting for receiving USB data in the case that the work mode is a USB mode, and executing Step S5 when the USB data is received;

Step S3, transferring the audio data to digital signals, composing the digital signals to obtain a data package, parsing the data package to obtain a parsing result, determining a type of an instruction according to the parsing result, if the instruction is an operating-card instruction, sending the operating-card instruction to a card, waiting for receiving an operation result returned by the card, and executing Step S4; if the instruction is the other instruction, executing a corresponding operation to obtain an operation result, and executing Step S4;

Step S4, transferring the operation result to an audio data package, sending the audio data package to the connected device, returning to Step S2; and Step S5, determining a type of the received USB data, if the received USB data is an operating-card instruction, sending the operating-card instruction to a card, waiting for receiving an operation result returned by the card, sending the operation result to a device which connects to the card reader, and returning to Step S2; if the received USB data is the other instruction, executing corresponding operation, and returning an operation result to the device which connects to the card reader, and returning to Step S2.

Preferably, in Step S1, setting the work mode according to a type of the device which connects to the card reader, specifically includes:

determining whether there exists a device which connects to the card reader via a USB module, if yes, setting the work mode as a USB mode; otherwise, setting the work mode as an audio mode; or, Step a1, determining whether there exists a device which connects to the card reader via an audio module, if yes, setting the work mode as the audio mode; otherwise, executing Step a2;

Step a2, determining whether there exists a device which connects to the card reader via a USB module, if yes, setting the work mode as the USB mode; otherwise, returning to Step a1; or Step b1, determining whether there exists a device which connects to the card reader via a USB module, if yes, setting the work mode as the USB mode; otherwise, executing Step b2;

Step b2, determining whether there exists a device which connects to the card reader via an audio module, if yes, setting the work mode as the audio mode; otherwise, returning to Step b1.

Preferably, in Step S5, returning to Step S2 further includes:

Step F1, determining whether the card reader connects to a power supply via the USB module, if yes, executing Step F2; otherwise, returning to Step S2; and Step F2, determining whether quantity of electric charge of a battery reaches a rated value, if yes, prompting overcharging of the battery, and returning to Step S2; otherwise, returning to Step S2.

Preferably, in Step S2, waiting for receiving the audio data specifically includes: determining whether the audio data is received via the audio mode in a preset duration, if yes, executing Step S3; otherwise, returning to Step S2.

Preferably, waiting for receiving the USB data specifically includes: determining whether the USB data is received via the USB module in a preset duration, if yes, executing Step S5; otherwise, determining whether the audio data is received via the audio module in the preset duration.

Preferably, in Step S1, initializing the card reader further includes: resetting a USB data transmission flag.

Preferably, after the work mode is set according to the device which connects to the card reader, the step further includes: turning on a corresponding data communication interrupt according to the work mode, in which the data communication interrupt includes: a USB data communication interrupt and an audio data communication interrupt; when the data communication interrupt is happened, executing Step S2.

Preferably, in Step S2, before waiting for receiving the audio data, the step further includes: turning off the USB data communication interrupt.

Preferably, in Step S4, before Step S2 is returned, the step further includes: turning on the USB data communication interrupt.

Preferably, before waiting for receiving the USB data, the step further includes: turning off the audio data communication interrupt, determining whether the USB data transmission flag is set, if yes, executing Step S5; otherwise, enabling a USB module connection, performing a USB data enumeration; determining whether the USB data enumeration is finished, setting the USB data transmission flag, and executing Step S5 in the case that the USB data enumeration is finished; waiting for the data communication interrupt and returning to Step S2 in the case that the USB data enumeration is not finished.

Preferably, in Step S5, before Step S2 is returned to, the step further includes: turning on the audio data communication interrupt.

Preferably, in Step S5, turning on the audio data communication interrupt specifically includes: determining whether there exists a device which connects to the card reader via an audio module, if yes, turning on the audio data communication interrupt; otherwise, returning to Step S2.

Preferably, in Step S5, after the audio data communication interrupt is turned on, the step further includes: determining whether there exists a device which connects to the card reader via the USB module, if yes, returning to Step S2; otherwise, turning off the USB data communication interrupt, resetting the USB data transmission flag, the card reader setting the work mode according to the type of the device which connects to the card reader, and executing Step S2.

Preferably, in Step S2, in the case that the work mode is the audio mode, the step further includes: initializing the audio module.

Preferably, initializing the audio module specifically includes: turning on a low-power-dissipation timer interrupt, determining whether the audio data is received, if yes, receiving the audio data, resetting a low-power-dissipation timer flag, turning off the low-power-dissipation timer interrupt, sending the audio data to the card reader, and turning on the low-power-dissipation timer interrupt; otherwise, setting the low-power-dissipation timer flag; and starting to time when the low-power-dissipation timer interrupt is turned on, entering a low-power-dissipation timer interruption per preset duration, in which, entering the low-power-dissipation timer interruption specifically includes: determining whether the low-power-dissipation timer flag is set, if yes, entering a low-power-dissipation mode; otherwise, exiting from the low-power-dissipation timer interrupt.

Preferably, in Step S3, transferring the audio data to the digital signals specifically includes:

performing, by the card reader, a filtering process on the audio data to obtain a first processed data, performing a blocking process on the first processed data to obtain alternating component from the first processed data; obtaining a second processed data from the alternating component, transferring the second processed data so as to obtain transferred data, and performing the filtering process on the transferred data to obtain the digital signals.

Preferably, in Step S3, after the digital signals is composed to the data package, and before the data package is parsed, the step further includes: determining whether the data package is legitimate, if yes, parsing the data package; otherwise, waiting for receiving the audio data, and when the audio data is received, returning to Step S3.

Preferably, determining whether the data package is legitimate specifically includes:

c1, obtaining data of four bytes starting from the first byte of the data package, making the data of four bytes as a frame header, determining whether the frame header is a first preset value, if yes, executing c2; otherwise, the data package is illegitimate;

c2, obtaining data at the seventh byte from the data package, making the data as a parameter flag, and determining whether the parameter flag is legitimate, if yes, executing c3; otherwise, the data package is illegitimate;

c3, obtaining data of two bytes starting from the eighth byte of the data package, making the data of two bytes as data-length-value, and executing c4;

c4, obtaining data whose length equals the data-length-value starting from the tenth byte, making the data as a data field, obtaining data of one byte behind the data field, making the data of one byte as a check word, and executing c5; and c5, calculating the data field via a preset algorithm to obtain a result, comparing the result with the check word, if the result is same as the check word, the data package is legitimate; if the result is not same as the check word, the data package is illegitimate.

Preferably, determining whether the parameter flag is legitimate in c2 specifically includes: determining whether the parameter flag is a second preset value or a third preset value, if yes, the parameter flag is legitimate; otherwise, the parameter flag is illegitimate.

Preferably, when the data package is legitimate, the step further includes: determining the parameter flag, parsing the data package in the case that the parameter flag is the second preset value; waiting for receiving data of a preset length in the case that the parameter flag is the third preset value, and adding the data into the data package, and parsing the current data package.

Preferably, in Step S4, transferring the operation result to the audio data package specifically includes:

compressing an amplitude voltage of the digital signals of the operation result, transferring the digital signals of the operation result to an analog signal which is similar to a sine wave by a process of charging and discharging slowly, and transferring the analog signal to an audio data package.

Preferably, in Step S1, initializing further includes: setting a card-slot-state flag as a no-card flag; setting the card-slot-state flag as a card-in flag in the case that a card-in-slot pin is a high level; setting the card-slot-state flag as the no-card flag in the case that the card-in-slot pin is a low level.

Preferably, in Step S3, the other instructions includes: an instruction for inquiring card-slot-state, a powering-on instruction, and a powering-off instruction.

Preferably, in Step S3, determining a type of the instruction according to the parsing result, inquiring a state of the card slot according to the card-slot-state flag in the case that the instruction is the instruction for inquiring card-slot-state, setting card-slot-state data, making the card-slot-state data as the operation result, and executing Step S4.

Preferably, in the case that the instruction is the powering-on instruction, determining whether there exists a card in the card slot according to the card-slot-state flag, if yes, powering on the card slot, reading a card-slot-powered-on response, making the card-slot-powered-on response as the operation result, and executing Step S4; otherwise, generating a no-card-in-slot response, making the no-card-in-slot response as the operation result, and executing Step S4.

Preferably, in the case that the instruction is the powering-off instruction, powering off the card slot, reading a card-slot-powered-off response, making the response as the operation result, and executing Step S4.

Preferably, in Step S5, the other instruction includes: the instruction for inquiring card-slot-state, the powering-on instruction, and the powering-off instruction.

Preferably, in Step S5, determining the type of instruction according to the parsing result, in the case that the instruction is the instruction for inquiring card-slot-state, inquiring the state of the card slot according to the card-slot-state flag, setting the card-slot-state data, sending the card-slot-state data to a device which connects to the card reader, and returning to Step S2.

Preferably, in the case that the instruction is the powering-on instruction, determining whether there exists a card in the card slot according to the card-slot-state flag, if yes, powering on the card slot, reading a card-slot-powered-on response, sending the card-slot-powered-on response to the device which connects to the card reader, and returning to Step S2; otherwise, generating a no-card-in-slot response, and sending the response to the device which connects to the card reader, and returning to Step S2.

Preferably, in the case that the instruction is the powering-off instruction, powering off the card slot, reading a card-slot-powered-off response, sending the response to the device which connects to the card reader, and returning to Step S2.

According to the other aspect of the present invention, there provides a method of a card reader, which includes:

Step W1, powering on a card reader, and initializing the card reader;

Step W2, waiting for receiving data;

Step W3, setting a work mode as a USB mode, and executing Step W4 when USB data is received via a USB channel; setting the work mode as an audio mode, and executing Step W5 when audio data is received via an audio channel;

Step W4, determining an type of the received USB data, if the received USB data is an operating-card instruction, sending the operating-card instruction to the card, waiting for receiving an operation result returned by the card, and executing Step W6; if the received USB data is another instruction, executing corresponding operation to obtain an operation result, and executing Step W6;

Step W5, transferring the audio data to digital signals, composing the digital signals to a data package, parsing the data package to obtain a parsing result, and determining a type of the instruction according to the parsing result, if the instruction is the operating-card instruction, sending the operating-card instruction to the card, waiting for an operation result returned by the card, and executing Step W6; if the instruction is another instruction, executing a corresponding operation to obtain an operation result, and executing Step W6; and Step W6, determining a work mode, sending the operation result to a device which connects to the card reader, and returning to Step W2 in the case that the work mode is a USB mode; transferring the operation result to an audio data package, sending the audio data package to the device which connects to the card reader, and returning to Step W2 in the case that the work mode is an audio mode.

Preferably, in Step W6, before Step W2 is returned to, the step further includes:

Step G1, determining whether the USB module is connected to a power supply, if yes, executing Step G2; otherwise, returning to Step W2;

Step G2, determining whether quantity of electric charge of the battery reaches a rated value, if yes, executing Step G3; otherwise, returning to Step W2; and Step G3, prompting over-charging of the battery, returning to Step W2.

Preferably, in Step W3, after the USB data is received via a USB channel, and before the work mode is set as the USB mode, the step further includes: turning off an audio data communication interrupt.

Preferably, in Step W6, in the case that the work mode is the USB mode, after the operation result is sent to the device connected to the card reader via a USB channel, and before Step W2 is returned to, the step further includes: turning on the audio data communication interrupt.

Preferably, in Step W3, after the audio data is received via an audio channel, and before the work mode is set as the audio mode, the step further includes: turning off a USB data communication interrupt.

Preferably, in Step W6, in the case that the woke mode is an audio mode, after the operation result is sent to the device connected to the card reader via the audio channel, and before Step W2 is returned to, the step further includes: turning on the USB data communication interrupt.

Preferably, Step W2 specifically includes: determining whether there exists a device which connects to the card reader via the USB module, if yes, waiting for receiving USB data, and executing Step W3; otherwise, determining whether audio data is received in a preset duration, executing Step W3 in the case that the audio data is received in the preset duration; entering a low-power-dissipation mode in the case that the audio data is not received in the preset duration.

Preferably, in Step W3, setting the work mode as the audio mode, and executing Step W5 when the audio data is received via the audio channel specifically includes: determining whether the work mode is a low-power-dissipation mode when the audio data is received via the audio channel, if yes, exiting from the low-power-dissipation mode, and executing Step W5; otherwise, executing Step W5.

Preferably, in Step W5, transferring the audio data to digital signals specifically includes:

performing, by the card reader, a filtering process on the audio data to obtain a first processed data, performing a blocking process on the first processed data to obtain alternating component from the first processed data; obtaining a second processed data from the alternating component, transferring the second processed data so as to obtain transferred data, and performing the filtering process on the transferred data to obtain the digital signals.

Preferably, in Step W5, after composing the digital signals to a data package, and before parsing the data package, the step further includes: determining whether the data package is legitimate.

Preferably, determining whether the data package is legitimate specifically includes:

L1, obtaining data of four bytes starting from the first byte of the data package, making the data of four bytes as a frame header, determining whether the frame header is a first preset value, if yes, executing L2; otherwise, the data package is illegitimate;

L2, obtaining data at the seventh byte from the data package, making the data as a parameter flag, and determining whether the parameter flag is legitimate, if yes, executing L3; otherwise, the data package is illegitimate;

L3, obtaining data of two bytes starting from the eighth byte of the data package, making the data of two bytes as a data-length-value, and executing L4;

L4, obtaining data whose length equals the data-length-value starting from the tenth byte, making the data as a data field, obtaining data of one byte behind the data field, making the data of one byte as a check word, and executing L5; and L5, calculating the data field via a preset algorithm to obtain a result, comparing the result with the check word, if the result is same as the check word, the data package is legitimate; if the result is not same as the check word, the data package is illegitimate.

Preferably, determining whether the parameter is legitimate specifically includes: the parameter flag is legitimate in the case that the parameter flag is the second preset value or the third preset value; the parameter flag is not legitimate in the case that the parameter is other values.

Preferably, when the data package is legitimate, the step further includes: determining the parameter, parsing the data package in the case that the parameter flag is the second preset value; waiting for receiving data of a preset length, putting the data into the data package, and then parsing the data package in the case that the parameter flag is the third preset value.

Preferably, in Step W6, transferring the operation result to an audio data package specifically includes:

compressing an amplitude voltage of the digital signals of the operation result, transferring the digital signals of the operation result to an analog signal which is similar to a sine wave through the process of charging or discharging slowly, and transferring the analog signal to an audio data package.

Preferably, in Step W1, initializing further includes: setting a card-slot-state flag as a no-card flag; setting the card-slot-state flag as a card-in flag in the case that a card-in-slot pin is a high level; setting the card-slot-state flag as the no-card flag in the case that the card-in-slot pin is a low level.

Preferably, in Step W4, the other instructions include: an instruction for inquiring card-slot-state, a powering-on instruction, and a powering-off instruction.

Preferably, in Step W4, determining a type of the received USB data, inquiring a state of the card slot according to the card-slot-state flag in the case that the instruction is the instruction for inquiring card-slot-state, setting card-slot-state data, making the card-slot-state data as the operation result, and executing Step W6.

Preferably, in the case that the instruction is the powering-on instruction, determining whether there exists a card in the card slot according to the card-slot-state flag, if yes, powering on the card slot, reading a card-slot-powered-on response, making the card-slot-powered-on response as the operation result, and executing Step W6; otherwise, generating a no-card-in-slot response, making the no-card-in-slot response as the operation result, and executing Step W6.

Preferably, in the case that the instruction is the powering-off instruction, powering off the card slot, reading a card-slot-powered-off response, making the response as the operation result, and executing Step W6.

Preferably, in Step W5, the other instructions include: the instruction for inquiring card-slot-state, the powering-on instruction, and the powering-off instruction.

Preferably, determining the type of instruction according to the parsing result, in the case that the instruction is the instruction for inquiring card-slot-state, inquiring the state of the card slot according to the card-slot-state flag, setting the card-slot-state data, making the card-slot-state data as an operation result, and executing Step W6.

Preferably, in the case that the instruction is the powering-on instruction, determining whether there exists a card in the card slot according to the card-slot-state flag, if yes, powering on the card slot, reading a card-slot-powered-on response, making the card-slot-powered-on response as an operation result, and executing Step W6; otherwise, generating a no-card-in-slot response, and making the no-card-in-slot response as an operation result, and executing Step W6.

Preferably, in the case that the instruction is the powering-off instruction, powering off the card slot, reading a card-slot-powered-off response, making the response as an operation result, and executing Step W6.

As one advantage of the present invention, a card reader communicates with a device via an audio module or a USB module, instead of relying on a USB module in a card reader in prior art, in this way, the card reader is more compatible and convenient for a user.

BRIEF DESCRIPTION OF THE ACCOMPANYING DRAWINGS

FIG. 2 is a flow diagram of a method for processing an inserting-card-in interrupt according to Embodiment 1 of the present invention;

FIG. 3 is a flow diagram of a method for processing a pulling-card-out interrupt according to Embodiment 1 of the present invention;

DETAILED DESCRIPTION OF THE INVENTION

The technical solution in the Embodiments of the present invention is further described more clearly and completely with the drawings in the Embodiments of the present invention. Apparently, Embodiments described are just a few Embodiments of the present invention. On the basis of Embodiments of the invention, all other related Embodiments made by those skilled in the art without inventive work belong to the scope of the invention.

Embodiment 1

Figure 1:
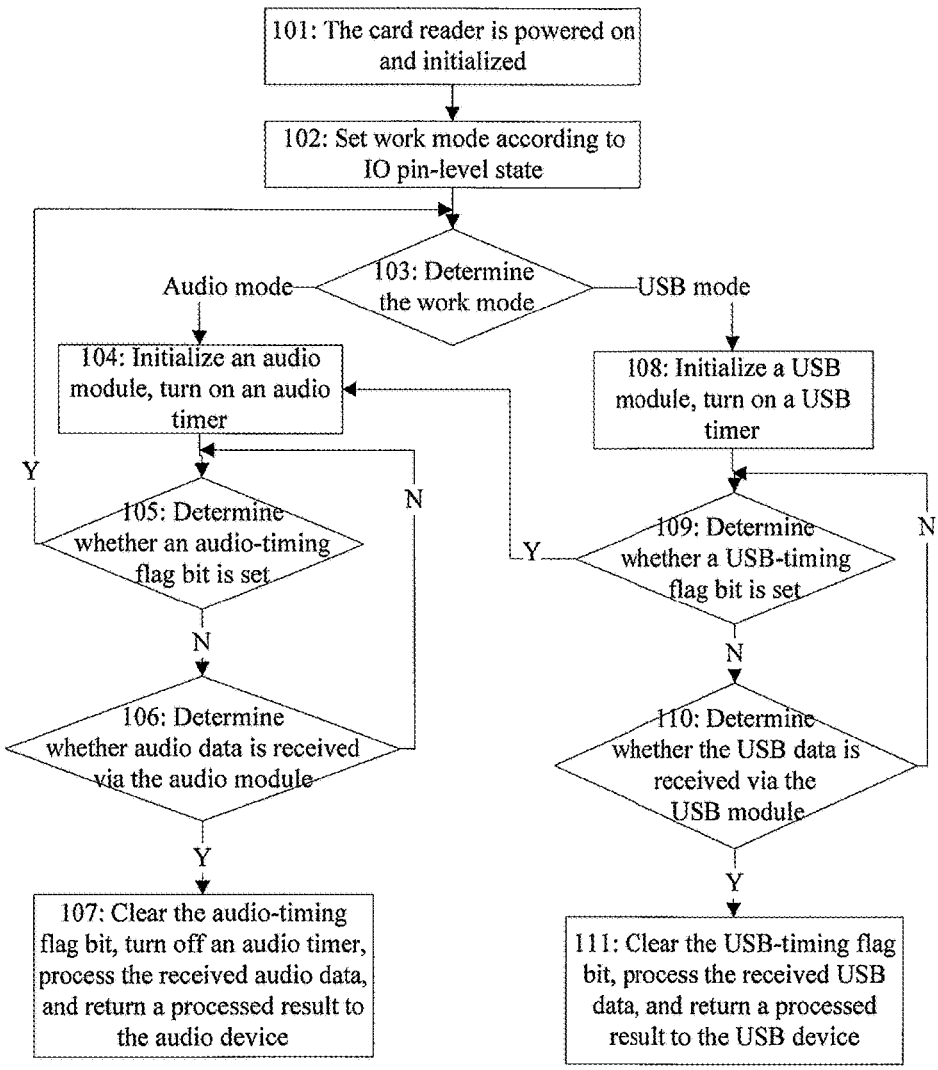
FIG. 1 is a flow diagram of a working method of a card reader according to Embodiment 1 of the present invention.

The present Embodiment 1 provides a working method of a card reader, as shown in FIG. 1, the method specifically includes following steps.

Step 101, a card reader is powered on and initialized;

in the present Embodiment 1, that the card reader is initialized specifically includes: a USB-channel-connect flag is reset, a card-in-slot pin is initialized as a low electric level, a card-slot-state is initialized as no-card flag. After the card reader is initialized, the method further includes: an interrupt is turned on, in which, the interrupt includes inserting-card-in interrupt and pulling-out-card interrupt.

When the card-in-slot pin of the card reader is high electric level, the inserting-card-in interrupt is entered, as shown in FIG. 2, which specifically includes:

Step a1, the interrupt is turned off, an inserting-card-in interrupt flag is cleared, a card-slot-state flag is set as a card-in flag;

preferably, the card-in flag is 0x00;

Step a2, determine whether the USB-channel-connect flag is set, if yes, execute Step a3; otherwise, execute Step a4;

in Embodiment 1, the USB-channel-connect flag is used for identifying whether the card reader connects to a USB device via a USB module; in the case that the card reader connects to the USB device via a USB module, the USB-channel-connect flag is set by the card reader, the USB module supplies power for the card reader, and the battery is charged by the USB module;

in the case that the USB module of the card reader does not connect to the USB device, the USB-channel-connect flag is reset by the card reader, the USB module stops supplying power for the card reader;

Step a3, an inserting-card-in response is written into an INT endpoint, and Step a4 is executed;

in Embodiment 1, the inserting-card-in response is 5003;

Step a4, determine whether a suspend flag is set, if yes, execute Step a5; otherwise, execute Step a6;

Step a5, the suspend flag is reset, MCU is waken up, and Step a6 is executed;

Step a6, the interrupt is turned on, and exit from the inserting-card-in interrupt.

In the case that the card-in-slot pin of the card reader is a lower electric level, the pulling-card-out interrupt is entered, as shown in FIG. 3, entering the pulling-card-out interrupt specifically includes:

Step b1, the interrupt is turned off, the pulling-card-out interrupt is cleared, the card-slot-state flag is set as no-card flag;

preferably, the no-card flag is 0X02;

Step b2, determine whether the USB-channel-connect flag is set, if yes, execute Step b3; otherwise, execute Step b4;

Step b3, a pulling-card-out response is written into the INT endpoint, and Step b4 is executed;

in Embodiment 1, the pulling-card-out response is 5002;

Step b4, the suspend flag is set, MCU is suspended, the interruption is turned on, the pulling-card-out interrupt is exited from.

Step 102, a work mode is set according to an IO pin-level state;

in present Embodiment 1, the work mode is set according to the IO pin-level state, the work mode is an audio mode in the case that the IO pin-level is low electric level; the work mode is set as a USB mode in the case that the IO pin-level is high electric level;

when the card reader connects to the USB device via a USB module, the IO pin-level is high electric level; when the card reader does not connect to the USB device via a USB module, the IO pin-level is low electric level.

When the IO pin-level is low electric level, the battery supplies power for the audio module; when the IO pin-level is high electric level, the battery stops supplying power for the audio module.

Step 103, the work mode is determined, Step 104 is executed in the case that the work mode is an audio mode; Step 108 is executed in the case that the work mode is a USB mode.

Step 104, the audio module is initialized, an audio timer is turned on, and Step 105 is executed;

in the present Embodiment 1, when the audio module is initialized, an audio-timing flag bit is cleared.

Figure 4:
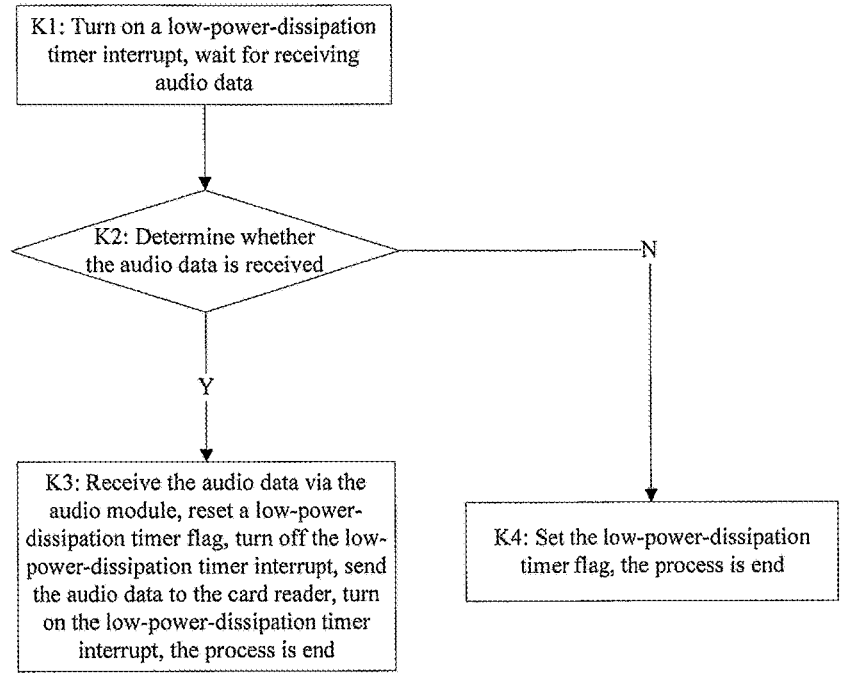
FIG. 4 is a flow diagram of a working method for initializing an audio module according to Embodiment 1 of the present invention.

When the audio module is initialized, as shown in FIG. 4, the process further includes:

Step K1, a low-power-dissipation timer interrupt is turned on, audio data waits for being received;

preferably, the low-power-dissipation timer interrupt is entered every 10 seconds.

Step K2, determine whether the audio data is received, if yes, Step K3 is executed; otherwise, Step K4 is executed;

Step K3, the audio data is received via the audio module, a low-power-dissipation timer flag is reset, the low-power-dissipation timer interrupt is turned off, the audio data is sent to the card reader, the low-power-dissipation timer interrupt is turned on, the present process is ended; and Step K4, the low-power-dissipation timer flag is set, the present process is ended;

in the present Embodiment 1, a low-power-dissipation timer interrupt is entered when the duration reaches 10 seconds, the low-power-dissipation timer flag is set.

Figure 5:
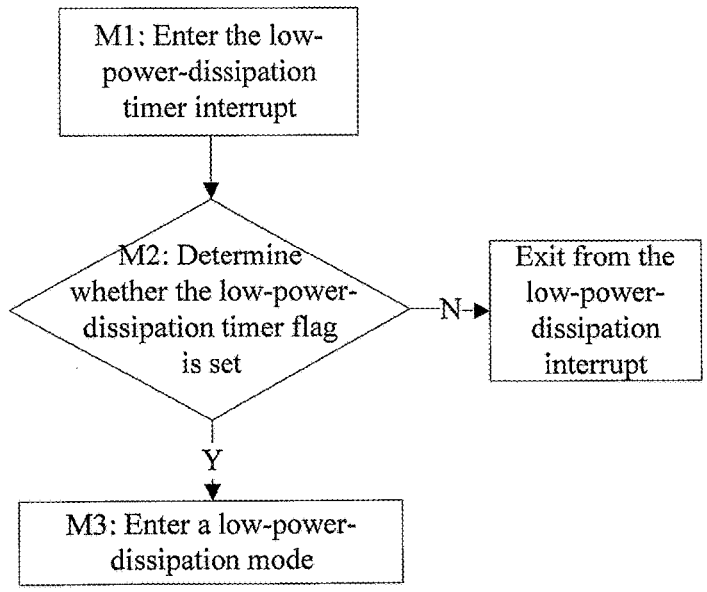
FIG. 5 is a flow diagram of a working method of a low-power-dissipation timer interrupt according to Embodiment 1 of the present invention.

When the low-power-dissipation timer interrupt is entered, as shown in FIG. 5, the following steps are executed:

Step M1, the low-power-dissipation timer interrupt is entered;

Step M2, determine whether the low-power-dissipation timer flag is set, if yes, execute Step M3; otherwise, exit from the low-power-dissipation timer interrupt; and Step M3, a low-power-dissipation mode is entered;

in the present Embodiment 1, when the audio data is received by the audio module, the low-power-dissipation mode is exited from.

Step 104 further includes: determine whether the working voltage is lower than the preset value, if yes, prompt that the working voltage is low, and stop supplying power for the card reader after a preset duration; otherwise, execute Step 105;

that the working voltage is low can be prompted by displaying on a screen and/or changing the color of a indicator light and/or buzzing and/or broadcasting; preferably, the preset duration is 30 seconds.

Step 105, determine whether an audio-timing flag bit is set, if yes, return to Step 103; otherwise, execute Step 106;

in the present Embodiment 1, the audio-timing flag bit is applied for identifying whether data is received by the card reader via the audio module in a preset duration. If the data is not received when the audio-timing flag bit reaches the preset duration, the audio-timing flag bit is set by the card reader.

Step 106, determine whether the audio data is received via the audio module, if yes, execute Step 107; otherwise, return to Step 105.

Step 107, the audio-timing flag bit is cleared, the audio timer is turned off, the received audio data is processed correspondingly to obtain a processed result, and the processed result is returned to the audio device.

In present Embodiment 1, more details about the received audio data is processed by the card reader see Embodiment 4.

Step 108, the USB module is initialized, a USB timer is turned on;

in the present Embodiment 1, initializing the USB module further includes: a USB timing flag bit is cleared.

Step 109, determine whether the USB timing flag bit is set, if yes, execute Step 104; otherwise, execute Step 110;

in the present Embodiment 1, the USB timing flag bit is applied for identifying whether USB data is received by the card reader via the USB module in the preset duration.

Step 110, determine whether the USB data is received via the USB module, if yes, execute Step 111; otherwise, return to Step 109.

Step 111, the USB timing flag bit is cleared, a USB timer is turned off, the received USB data is processed correspondingly to obtain a processed result, the processed result is returned to the USB device.

In the present Embodiment 1, more details about processing the USB data, which can be seen in Embodiment 5, are omitted herein.

Embodiment 2

Figure 6:
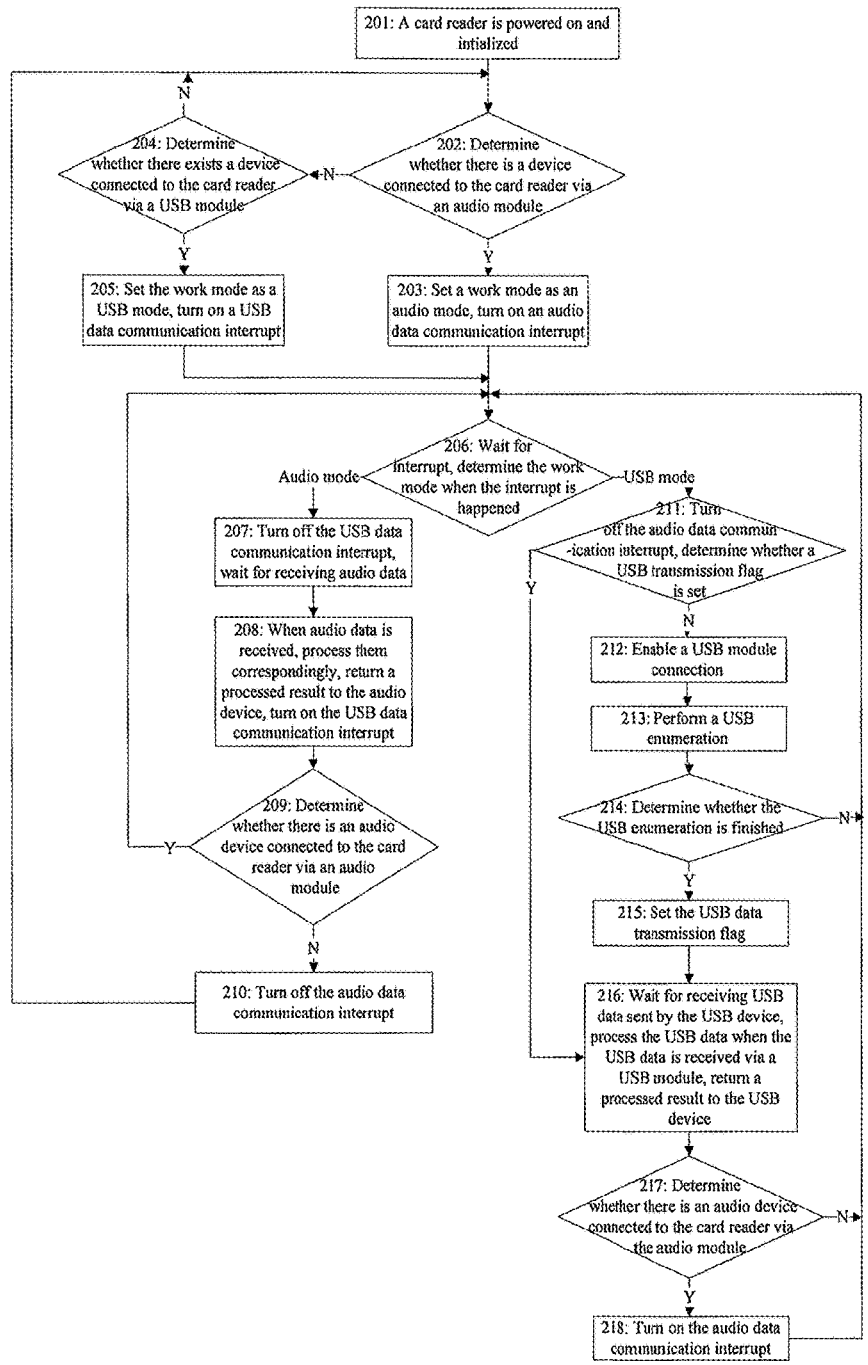
FIG. 6 is a flow diagram of a working method of a card reader according to Embodiment 2 of the present invention.

Embodiment 2 of the present invention provides a working method of a card reader, as shown in FIG. 6, the method includes following steps.

Step 201, the card reader is powered on and initialized;

the operation of Step 201 is as same as that of Step 101, besides, Step 201 further includes: a USB data transmission flag is reset.

In the case that a card-in-slot pin is high electric level, an inserting-card-in interrupt is executed, specific operation is as same as that from Step a1 to Step a6 in Embodiment 1, more details will not given herein.

In the case that the card-in-slot pin is low electric level, pulling-card-out interrupt is executed, specific operation is as same as that from Step b1 to Step b4 in Embodiment 1, more details will not given herein.

Step 202, determine whether there exists an audio device which connects to the card reader via an audio module, if yes, execute Step 203; otherwise, execute Step 204.

Step 203, the work mode is set as the audio mode, an audio data communication interrupt is turned on, Step 206 is executed.

Step 204, determine whether there exists a USB device which connects to the card reader via a USB module, if yes, execute Step 205; otherwise, execute Step 202.

Step 205, the work mode is set as the USB mode, a USB data communication interrupt is turned on, and Step 206 is executed.

In the present Embodiment 2, the steps from Step 202 to Step 205 may be replaced with:

Step 202', determine whether there exists a USB device which connects to the card reader via a USB module, if yes, execute Step 203'; otherwise, execute Step 204';

Step 203', the work mode is set as the USB mode, the USB data communication interrupt is turned on, Step 206 is executed;

Step 204', determine whether there exists an audio device which connects to the card reader via an audio module, if yes, execute Step 205'; otherwise, execute Step 202'; and Step 205', the work mode is set as the audio mode, the audio data communication interrupt is turned on, Step 206 is executed.

Step 206, wait for an interrupt, determine the work mode when the interrupt is happened, execute Step 207 in the case that the work mode is the audio mode; execute Step 211 in the case that the work mode is the USB mode.

Step 207, the USB data communication interrupt is turned off, audio data waits for being received, and Step 208 is executed.

Step 208, when the audio data is received, the audio data is processed correspondingly to obtain a processed result, the processed result is returned to the audio device, the USB data communication interrupt is turned on;

in the present Embodiment 2, more details about processing the received audio data by the card reader see Embodiment 4.

Step 209, determine whether there exists an audio device which connects to the card reader via an audio module, if yes, return to Step 206; otherwise, execute Step 210.

Step 210, the audio data communication interrupt is turned off, and Step 202 is returned to.

Step 211, the audio data communication interrupt is turned off, whether the USB data transmission flag is set is determined, if yes, Step 216 is executed; otherwise, Step 212 is executed;

in the present Embodiment 2, when the USB device is pulled out, the USB data transmission flag is reset.

Step 212, a USB module connection is enabled, and Step 213 is executed.

Step 213, a USB enumeration is executed.

Step 214, determine whether the USB enumeration is finished, if yes, execute Step 215; otherwise, return to Step 206.

Step 215, the USB data transmission flag is set, and Step 216 is executed.

Step 216, wait for receiving USB data sent by the USB device, when the USB data is received via the USB module, the USB data is processed correspondingly to obtain a processed result, the processed result is returned to the USB device, and Step 217 is executed;

in the present Embodiment 2, more details about the process of processing the USB data by the card reader see Embodiment 5.

Step 217, determine whether there exists an audio device which connects to the card reader via an audio module, if yes, execute Step 218; otherwise, return to Step 206.

Step 218, the audio data communication interrupt is turned on, and Step 206 is executed.

Embodiment 3

Figure 7:
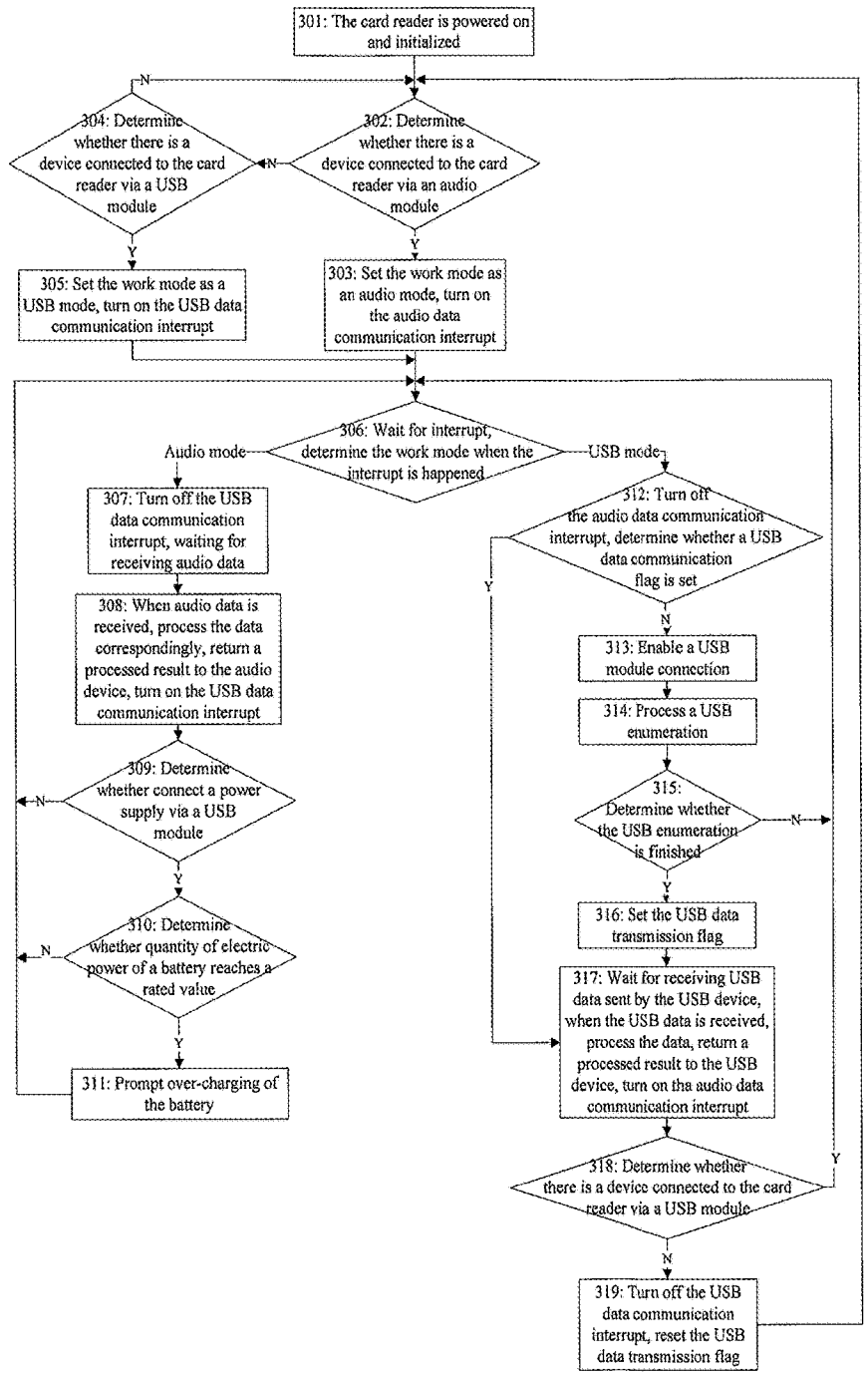
FIG. 7 is a flow diagram of a working method of a card reader according to Embodiment 3 of the present invention.

The present Embodiment 3 provides a working method of a card reader, as shown in FIG. 7, the working method includes following steps.

Step 301, the card reader is powered on and initialized;

in the present Embodiment 3, initializing the card reader specifically includes: a USB-channel-connect flag is reset, a card-in-slot pin is initialized as a low electric level, a card-slot-state flag is initialized as a no-card flag. After the card reader is initialized, the step further includes: an interrupt is turned on, in which, the interrupt includes an inserting-card-in interrupt and a pulling-card-out interrupt.

When the card-in-slot pin of the card reader is a high electric level, the inserting-card-in interrupt is entered, the specific operation is as same as that from Step a1 to Step a6 in Embodiment 1, more details will not be given herein.

When the card-in-slot pin of the card reader is a low electric level, the pulling-card-out interruption is entered, specific operation is as same as that from Step b1 to Step b4 in Embodiment 1, more details will not be given herein.

Step 302, determine whether there exists an audio device which connects to the card reader via an audio module, if yes, execute Step 303; otherwise, execute Step 304.

Step 303, the work mode is set as an audio mode, an audio data communication interrupt is turned on, and Step 306 is executed.

Step 304, determine whether there exists a USB device which connects to the card reader via a USB module, if yes, execute Step 305; otherwise, return to Step 302.

Step 305, the work mode is set as a USB mode, a USB data communication interrupt is turned on, Step 306 is executed.

In the present Embodiment 3, steps from Step 302 to Step 305 may be replaced with:

Step 302', determine whether there exists a USB device which connects to the card reader via the USB module, if yes, execute Step 303'; otherwise, execute Step 304';

Step 303', the work mode is set as the USB mode, the USB data communication interrupt is turned on, and Step 306 is executed;

Step 304', determine whether there exists an audio device which connects to the card reader via the audio module, if yes, execute Step 305'; otherwise, return to Step 302'; and Step 305', the work mode is set as the audio mode, the audio data communication interrupt is turned on, and Step 306 is executed.

Step 306, wait for an interrupt, when the interrupt is happened, determine the work mode, execute Step 307 in the case that the work mode is the audio mode; execute Step 312 in the case that the work mode is the USB mode.

Step 307, the USB data communication interrupt is turned off, the audio data waits for being received, and Step 308 is executed.

Step 308, when the audio data is received, the audio data is processed correspondingly to obtain a processed result, the processed result is returned to the audio device, and the USB data communication interrupt is turned on;

in the present Embodiment 3, specific details about the process of processing the received audio data by the card reader, which can be seen in Embodiment 4, are omitted herein.

Step 309, determine whether the card reader connects to a power supply via a USB module, if yes, execute Step 310; otherwise, return to Step 306;

in the present Embodiment 3, determining whether the card reader connects a power supply via a USB module specifically includes: the card reader determines whether an IO pin is a high electric level and whether there is no communication signal, if yes, the card reader connects to the power supply via the USB module; otherwise, the card reader does not connects to the power supply via the USB module.

Step 310, determine whether quantity of electric charge of the battery reaches a rated value, if yes, execute Step 311; otherwise, execute Step 306.

Step 311, prompt over-charging of the battery, and return to Step 306.

Step 312, the audio data communication interrupt is turned off, whether the USB data transmission flag is set is determined, if yes, Step 317 is executed; otherwise, Step 313 is executed.

Step 313, a USB module connection is enabled.

Step 314, a USB enumeration is executed.

Step 315, determine whether the USB enumeration is finished, if yes, execute Step 316; otherwise, return to Step 306.

Step 316, the USB data transmission flag is set, and Step 317 is executed.

Step 317, wait for receiving the USB data sent by the USB device, when the USB data is received via the USB module, the USB data is processed correspondingly to obtain a processed result, the processed result is returned to the USB device, the audio data communication interrupt is turned on;

in the present Embodiment 3, specific details about the process of processing the USB data by the card reader see Embodiment 5.

Step 318, determine whether there exists a USB device which connects to the card reader via the USB module, if yes, return to Step 306; otherwise, execute Step 319.

Step 319, the USB data communication interrupt is turned off, the USB data transmission flag is reset, and Step 302 is returned to.

Embodiment 4

Figure 8:
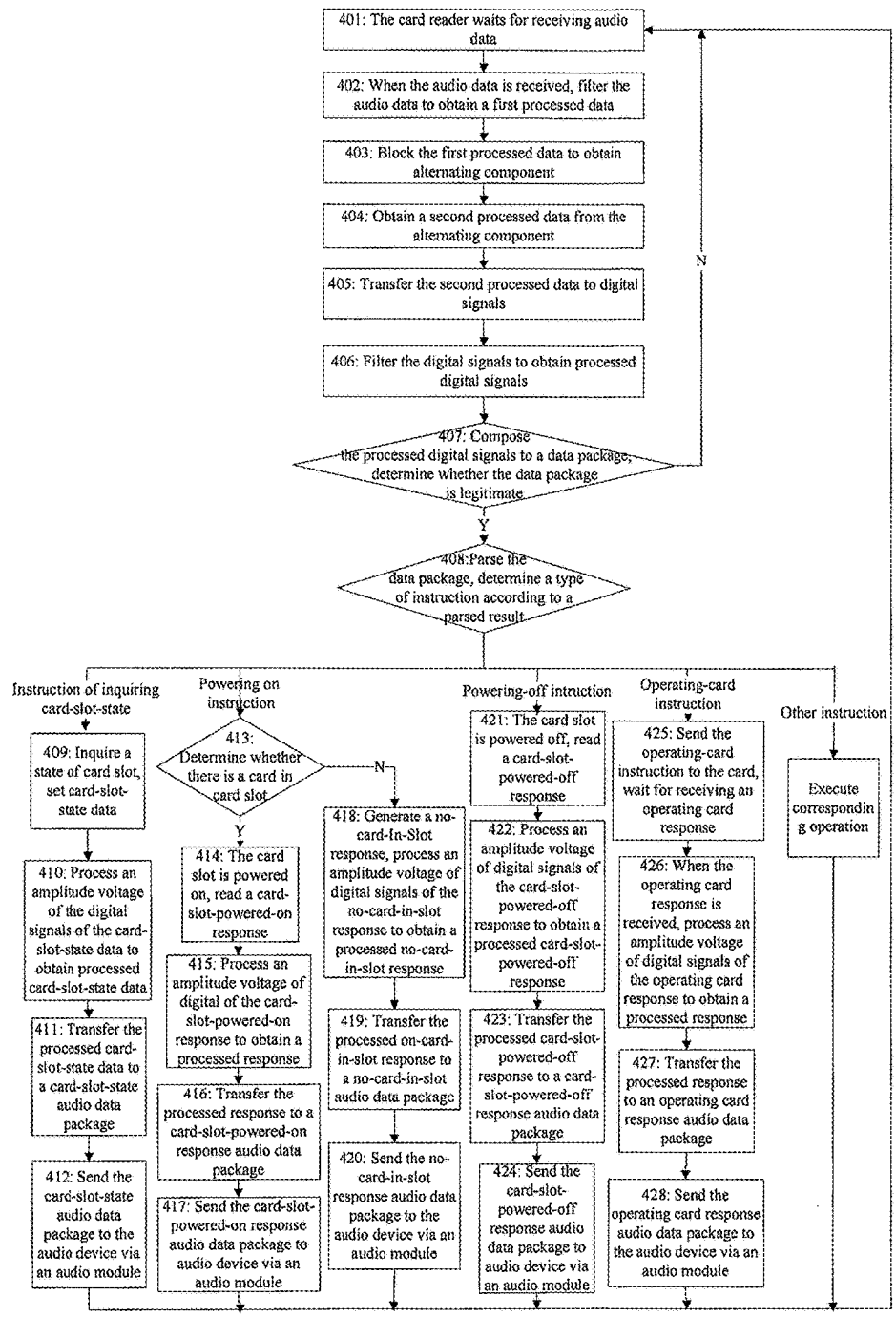
FIG. 8 is a flow diagram of a method for processing audio data according to Embodiment 4 of the present invention.

The present Embodiment 4 provides a method for processing audio data, as shown in FIG. 8, the method specifically includes following steps.

Step 401, a card reader waits for receiving audio data.

Step 402, when the audio data is received, perform a filtering process on the audio data to obtain a first processed data.

Specifically, the card reader filters noises from the audio data to obtain clear audio data which is made as the first processed data.

Step 403, perform a blocking process on the first processed data to obtain alternating component from the first processed data.

Step 404, a second processed data is obtained from the alternating component;

specifically, the card reader obtains data whose frequency is higher than a cut-off frequency from the alternating component, and the data is made as the second processed data.

Step 405, the second processed data is transferred to digital signals.

Step 406, perform the filtering process on the digital signals to obtain processed digital signals.

Step 407, the processed digital signals compose a data package, whether the data package is legitimate is determined, if yes, Step 408 is executed; otherwise, Step 401 is executed.

Figure 9:
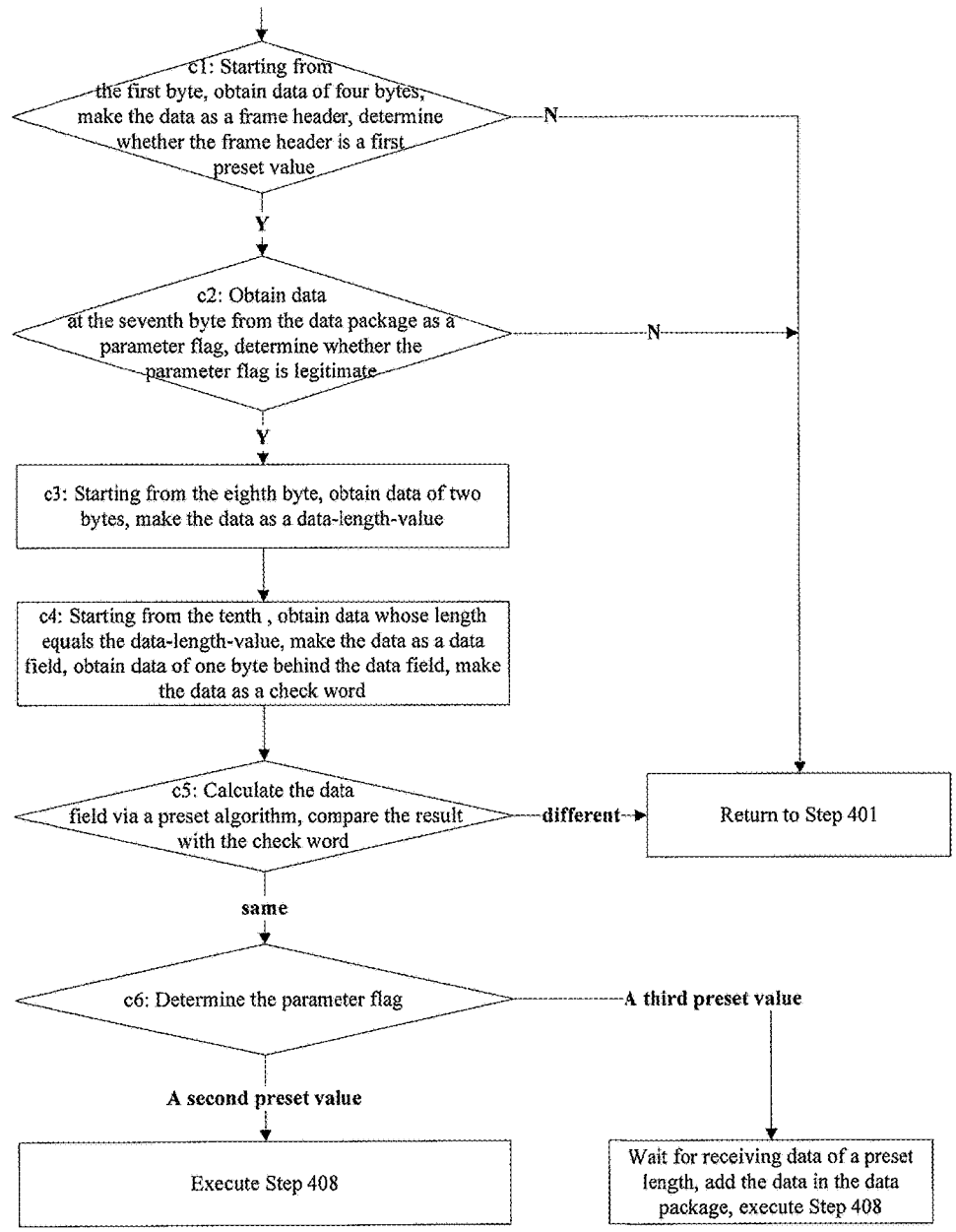
FIG. 9 is a flow diagram of a method for determining whether a data package is legitimate according to Step 407 in Embodiment 4 of the present invention.

In the present Embodiment 4, as shown in FIG. 9, determining whether the data package is legitimate includes:

c1, starting from the first byte of the data package, data of four bytes is obtained, the data of four bytes is made as a frame header, whether the frame header is a first preset value is determined, if yes, c2 is executed; otherwise, Step 401 is returned to;

preferably, the first preset value is 0X0ff055aa;

c2, data at a seventh byte is obtained from the data package and made as a parameter flag, whether the parameter flag is legitimate is determined, if yes, c3 is executed; otherwise, Step 401 is returned to;

determining whether the parameter is legitimate specifically includes: if the parameter flag is a second preset value or a third preset value, the parameter flag is legitimate; otherwise, the parameter flag is illegitimate; preferably, the second preset value is 0X01; the third preset value is 0X02;

c3, starting from the eighth byte, data of two bytes is obtained from the data package, the data of two bytes is made as data-length-value, and c4 is executed;

c4, starting from the tenth byte, data whose length equals the data-length-value is obtained and made as a data field, data of one byte behind the data field is made as a check word, c5 is executed;

c5, the data field is calculated via a preset algorithm to obtain a calculated result, the calculated result is compared with the check word, if the calculated result is as same as the check word, c6 is executed; if the calculated result is not as same as the check word, Step 401 is returned to; and c6, the parameter flag is determined, Step 408 is executed in the case that the parameter flag is the second preset value; wait for receiving data of a preset length in the case that the parameter flag is the third preset value, the data of a preset length is added into the data package, Step 408 is executed.

Preferably, the preset length is ten bytes.

Step 408, the data package is parsed, a type of instruction is determined according to a parsing result, Step 409 is executed in the case that the instruction is an instruction for inquiring card-slot-state; Step 413 is executed in the case that the instruction is a powering-on instruction; Step 421 is executed in the case that the instruction is a powering-off instruction; Step 425 is executed in the case that the instruction is an operating-card instruction; execute corresponding operation in the case that the instruction is other instruction, and return to Step 401;

in the present Embodiment 4, determine a type of the instruction according to a first byte of the parsing result;

if the first byte is 0X65, the instruction is an instruction for inquiring card-slot-state;

if the first byte is 0X62, the instruction is a powering-on instruction;

if the first byte is 0X63, the instruction is a powering-off instruction; and if the first byte is 0X6f, the instruction is an operating-card instruction.

Step 409, a state of the card slot is inquired according to the card-slot-state flag, and card-slot-state data is set;

in the present Embodiment 4, if the card-slot-state flag is a card-in flag, there is a card is the card slot, and a preset byte of the card-slot-state data is set as 0X00;

if the card-slot-state flag is a no-card flag, there is no card in the card slot, and the preset byte of the card-slot-state is set as 0X02;

preferably, the preset byte of the card-slot-state data is the eighth byte of the card-slot-state data.

Step 410, an amplitude voltage of the digital signals of the card-slot-state data is processed to obtain a processed card-slot-state data.

Step 411, the processed card-slot-state data is transferred to a card-slot-state audio data package;

specifically, the processed card-slot-state data is transferred to analog signals which are similar as a sine wave through a process of charging or discharging slowly, then, the analog signals are transferred to the card-slot-state audio data package.

Step 412, the card-slot-state audio data package is sent to the audio device via an audio module, and Step 401 is returned.

Step 413, determine whether there is a card in the card slot according to the card-slot-state flag, if yes, execute Step 414; otherwise, execute Step 418;

in the present Embodiment 4, if the card-slot-state flag is the card-in flag, there is a card in the card slot; if the card-slot-state flag is the no-card flag, there is no card in the card slot.

Step 414, the card slot is powered on, a card-slot-powered-on response is read; for example, a read card-slot-powered-on response is 800c00000000120000003bf095000081b1fe9a1f0729;

Step 415, an amplitude voltage of digital signals of the card-slot-powered-on response is processed to obtain a processed card-slot-powered-on response.

Step 416, the processed card-slot-powered-on response is transferred to the card-slot-powered-on response audio data package.

Specifically, the processed card-slot-powered-on response is transfer to analog signals which are similar to a sine wave through a process of charging and discharging slowly, and the analog signals is transferred into the card-slot-powered-on response audio data package.

Step 417, the card-slot-powered-on response audio data package is sent to the audio device via the audio module, and Step 401 is returned to.

Step 418, a no-card-in-slot response is generated, an amplitude voltage of digital signals of no-card-in-slot response is processed to obtain a processed no-card-in-slot response.

Step 419, the processed no-card-in-slot response is transferred to no-card-in-slot response audio data package;

specifically, the processed no-card-in-slot response is transferred to an analog signals which are similar to a sine wave through a process of charging and discharging slowly, and the analog signals are transferred to the no-card-in-slot response audio data package.

Step 420, the no-card-in-slot response audio data package is sent to the audio device via the audio module, and Step 401 is returned.

Step 421, the card slot is powered off, a card-slot-powered-off response is read;

in the present Embodiment 4, the card slot is powered off by the card reader, the card-slot-powered-off response is read, the first byte of the card-slot-powered-off response is 0X81; for instance, 81000000000004010000.

Step 422, an amplitude voltage of digital signals of the card-slot-powered-off response is processed to obtain a processed card-slot-powered-off response.

Step 423, the processed card-slot-powered-off response is transferred to a card-slot-powered-off response audio data package;

specifically, the processed card-slot-powered-off response is transferred to analog signals which are similar to the sine wave through a process of charging and discharging slowly, the analog signals are transferred to the card-slot-powered-off response audio data package.

Step 424, the card-slot-powered-off response audio data package is sent to the audio device via the audio module, and Step 401 is returned to.

Step 425, the operating-card instruction is sent to the card, an operating-card response returned by the card waits for being received;

in the present Embodiment 4, after the operating-card instruction is received by the card, the card executes a corresponding operation according to the instruction, and returns a corresponding operating-card response to the card reader.

Step 427, the processed operating-card response is transferred into an operating-card response audio data package;

specifically, the processed operating-card response is transferred to analog signals which similar to the sine wave through the process of charging and discharging slowly, and the analog signals are transferred to the operating-card response audio data package.

Step 428, the operating-card response audio data package is sent to the audio device via the audio module, and Step 401 is returned to.

Embodiment 5

Figure 10:
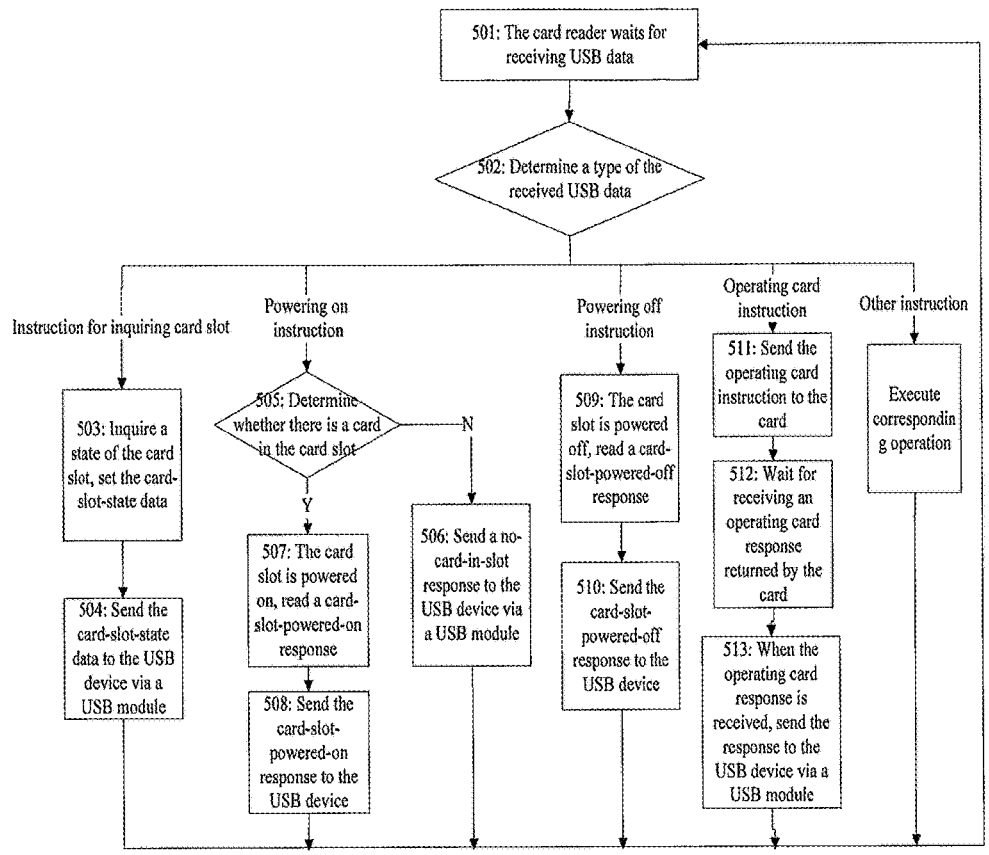
FIG. 10 is a flow diagram of a method for processing USB data according to Embodiment 5 of the present invention.

The present Embodiment 5 provides a method for processing USB data, as shown in FIG. 10, the method specifically includes the following steps.

Step 501, the card reader waits for receiving USB data.

Step 502, determine a type of the received USB data, execute Step 503 in the case that the received USB data is an instruction for inquiring card-slot-state; execute Step 505 in the case that the received USB data is a powering-on instruction; execute Step 509 in the case that the received USB data is a powering-off instruction; execute Step 511 in the case that the received USB data is an operating-card instruction; execute a corresponding operation in the case that the received USB data is other instruction, and then return to Step 501;

in the present Embodiment 5, the card reader determines the type of the instruction according to a first byte of the USB data;

specifically, the received USB data is the instruction for inquiring card-slot-state in the case that the first byte is 0X65;

the received USB data is the powering-on instruction in the case that the first byte is 0X62;

the received USB data is the powering-off instruction in the case that the first byte is 0X63; and the received USB data is the operating-card instruction in the case that the first byte is 0X6f.

Step 503, the state of the card slot is inquired according to the card-slot-state flag, and the card-slot-state data is set;

in the present Embodiment 5, if the card-slot-state flag is a card-in flag, there is a card in the card slot, a preset byte of the card-slot-state data is set as 0X00;

if the card-slot-state flag is a no-card flag, there is no card in the card slot, the preset byte of the card-slot-state is set as 0X02;

preferably, the preset byte of the card-slot-state data is the eighth byte of the card-slot-state data.

Step 504, the card-slot-state data is sent to the USB device via the USB module, and Step 501 is returned to.

Step 505, determine whether there exists a card in the card slot according to the card-slot-state flag, if yes, execute Step 507; otherwise, execute Step 506;

in the present Embodiment 5, if the card-slot-state flag is a card-in flag, there is a card in the card slot; if the card-slot-state flag is a no-card flag, there is no card in the card slot.

Step 506, a no-card-in-slot response is sent to the USB device via the USB module, Step 501 is returned to.

Step 507, the card slot is powered on, a card-slot-powered-on response is read; for instance, the read card-slot-powered-on response is 800c00000000215000003bf095000081b1fe9a1f0729.

Step 508, the card-slot-powered-on response is sent to the USB device via the USB module, Step 501 is returned to.

Step 509, the card slot is powered on, a card-slot-powered-off response is read;

in the present Embodiment 5, the card slot is powered off by the card reader, the card-slot-powered-off response is read, the first byte of the card-slot-powered-off response is 0X81; for instance, 81000000000004010000.

Step 510, the card-slot-powered-off response is sent to the USB device via the USB module, Step 501 is returned to.

Step 511, the operating-card instruction is sent to the card.

Step 512, wait for receiving an operating-card response returned by the card.

In the present Embodiment 5, after the operating-card instruction is received, execute corresponding operation according to the operating-card instruction, and return a corresponding operating-card response to the card reader. For instance, 80050000000001800000000eA1f010.

Step 513, when the operating-card response is received, the operating-card response is sent to the USB device via the USB module, and Step 501 is returned to.

Embodiment 6

The present Embodiment 6 provides a working method of a card reader, which includes following steps.

Step 601, the card reader is powered on and initialized; an operational approach of Step 601 is as same as that of Step 101.

Step 602, wait for receiving data.

Specifically, determine whether there exists a device which connects to the card reader via a USB module, if yes, wait for receiving USB data, and execute Step 603; otherwise, determine whether audio data is received in a preset duration, execute Step 603 in the case that the audio data is received in the preset duration; enter a low-power-dissipation mode in the case that the audio data is not received in the preset duration.

Step 603, when the USB data is received via a USB channel, an audio data communication interrupt is turned off, a work mode is set as a USB mode, and Step 604 is executed; when the audio data is received via an audio channel, a USB data communication interrupt is turned off, the work mode is set as an audio mode, and Step 605 is executed.

Specifically, when the audio data is received via the audio channel, determine whether the work mode is the low-power dissipation mode, if yes, exit from the low-power dissipation mode, and execute Step 605; otherwise, execute Step 605.

Step 604, determine a type of the received USB data, the operating-card instruction is sent to the card in the case that the USB data is an operating-card instruction, an operation result returned by the card waits for being received, Step 606 is executed; a corresponding operation is executed to obtain an operation result, and Step 606 is executed.

Step 605, the audio data is transferred to digital signals, the digital signals compose a data package, the data package is parsed to obtain a parsing result, a type of the instruction is determined according to the parsing result, if the instruction is an operating-card instruction, the operating-card instruction is sent to the card, an operation result returned by the card waits for being received, and Step 606 is executed; if the instruction is other instruction, a corresponding operation is executed to obtain an operation result, and Step 606 is executed;

the operational approach of Step 605 is as same as that of Embodiment 4, no more details will be given herein.

Step 606, determine the work mode, in the case that the work mode is the USB mode, the operation result is sent to the device which connects to the card reader, an audio data communication interrupt is turned on, and Step 607 is executed; in the case that the work mode is the audio mode, the operation result is transferred to an audio data package, the audio data package is sent to the device which connects to the card reader, a USB data communication interrupt is turned on, and Step 607 is executed;

the operational approach of Step 606 is as same as that of Embodiment 5, more details will not be given herein.

Step 607, determine whether the USB module connects a power supply, if yes, execute Step 608; otherwise, return to Step 602.

Step 608, determine whether the quantity of electric charge of the battery reaches a rated value, if yes, execute Step 609; otherwise, return to Step 602.

Step 609, prompt over-charging of the battery, and return to Step 602.

While the preferred Embodiments of the present invention have been shown and described herein, it will be obvious for those skilled in the art that such Embodiments are provided by way of examples only. Any changes and substitutions will be covered by the scope of protection of the present invention. It is intended that the appended claims define the scope of protection of the present invention.

The invention claimed is:

1. A card reader, said card reader works with a computer to perform a working method comprising the steps of:
  Step S1, powering on, by a card reader, initializing, and setting a work mode according to a type of a device which connects to the card reader;
  Step S2, determining the work mode, waiting for receiving audio data in the case that the work mode is an audio mode, and executing Step S3 when the audio data is received; waiting for receiving USB data in the case that the work mode is a USB mode, and executing Step S5 when the USB data is received;

Step S3, transferring the audio data into digital signals, composing the digital signals to obtain a data package, parsing the data package to obtain a parsing result, determining a type of an instruction according to the parsing result; sending an operating-card instruction to a card, waiting for receiving an operation result returned by the card, and executing Step S4 if the instruction is the operating-card instruction; otherwise, executing a corresponding operation to obtain an operation result, and executing Step S4;

Step S4, transferring the operation result to an audio data package, sending the audio data package to a connected device, and returning to Step S2; and Step S5, determining a type of the received USB data; sending the operating-card instruction to the card, waiting for receiving an operation result returned by the card, sending the operation result to a device which connects to the card reader, and returning to Step S2 if the received USB data is an operating-card instruction; executing corresponding operation, and returning an operation result to the device which connects to the card reader, and returning to Step S2 if the received USB data is the other instruction.

2. The card reader as claimed in claim 1, wherein setting the work mode according to a type of the device which connects to the card reader in Step S1, specifically comprises:

determining whether there exists a device which connects to the card reader via a USB module, if yes, setting the work mode as a USB mode; otherwise, setting the work mode as an audio mode; or, Step a1, determining whether there exists a device which connects to the card reader via an audio module, if yes, setting the work mode as the audio mode; otherwise, executing Step a2;

Step a2, determining whether there exists a device which connects to the card reader via a USB module, if yes, setting the work mode as the USB mode; otherwise, returning to Step a1; or Step b1, determining whether there exists a device which connects to the card reader via a USB module, if yes, setting the work mode as the USB mode; otherwise, executing Step b2;

Step b2, determining whether there exists a device which connects to the card reader via an audio module, if yes, setting the work mode as the audio mode; otherwise, returning to Step b1.

3. The card reader as claimed in claim 1, wherein returning to Step S2 in Step S5 further comprises:

Step F1, determining whether the card reader connects to a power supply via the USB module, if yes, executing Step F2; otherwise, returning to Step S2; and Step F2, determining whether quantity of electric charge of a battery reaches a rated value, if yes, prompting over-charging of the battery, and returning to Step S2; otherwise, returning to Step S2.

4. The card reader as claimed in claim 1, wherein in Step S2, waiting for receiving the audio data, specifically comprises:

determining whether the audio data is received via the audio module in a preset duration, if yes, executing Step S3; otherwise, returning to Step S2;

waiting for receiving the USB data, specifically comprises: determining whether the USB data is received via the USB module in a preset duration, if yes, executing Step S5; otherwise, determining whether the audio data is received via the audio module in the preset duration.

5. The card reader as claimed in claim 1, wherein, initializing in Step S1 further comprises: resetting a USB data transmission flag;

after the work mode is set according to the device which connects to the card reader, the step further comprises: turning on a corresponding data communication interrupt according to the work mode, in which the data communication interrupt includes: a USB data communication interrupt and an audio data communication interrupt; when the data communication interrupt is happened, executing Step S2;

before waiting for receiving the audio data, Step 2 further comprises: turning off the USB data communication interrupt;

before returning to Step S2, Step S4 further comprises: turning on the USB data communication interrupt;

before waiting for receiving the USB data, the step further comprises: turning off the audio data communication interrupt, determining whether the USB data transmission flag is set, if yes, executing Step S5; otherwise, enabling a USB module connection, and performing a USB data enumeration; determining whether the USB data enumeration is finished, if yes, setting the USB data transmission flag, and executing Step S5; otherwise, waiting for the data communication interrupt and returning to Step S2;

before returning to Step S2, Step S5 further comprises: turning on the audio data communication interrupt;

turning on the audio data communication interrupt in Step S5, specifically comprises: determining whether there exists a device which connects to the card reader via the audio module, if yes, turning on the audio data communication interrupt; otherwise, returning to Step S2; or after turning on the audio data communication interrupt, Step S5 further comprises: determining whether there exists a device which connects to the card reader via the USB module, if yes, returning to Step S2; otherwise, turning off the USB data communication interrupt, resetting the USB data transmission flag, setting, by the card reader, the work mode according to the type of the device which connects to the card reader, and executing Step S2.

6. The card reader as claimed in claim 1, wherein, in the case that the work mode is the audio mode, Step S2 further comprises:

initializing the audio module;

initializing the audio module specifically comprises: turning on a low-power-dissipation timer interrupt, determining whether the audio data is received, if yes, receiving the audio data, resetting a low-power-dissipation timer flag, turning off the low-power-dissipation timer interrupt, sending the audio data to the card reader, and turning on the low-power-dissipation timer interrupt; otherwise, setting the low-power-dissipation timer flag;

starting to count time when the low-power-dissipation timer interrupt is turned on, entering a low-power-dissipation timer interruption per preset duration; entering the low-power-dissipation timer interruption specifically comprises: determining whether the low-power-dissipation timer flag is set, if yes, entering a low-power-dissipation mode; otherwise, exiting from the low-power-dissipation timer interrupt.

7. The card reader as claimed in claim 1, wherein, transferring the audio data into the digital signals in Step S3 specifically comprises:

performing, by the card reader, a filtering process on the audio data to obtain a first processed data, performing a blocking process on the first processed data to obtain alternating component from the first processed data; obtaining a second processed data from the alternating component, transferring the second processed data so as to obtain transferred data, and performing the filtering process on the transferred data to obtain the digital signals.

8. The card reader as claimed in claim 1, wherein in Step S3, after the digital signals compose the data package, and before the data package is parsed, the step further comprises: determining whether the data package is legitimate, if yes, parsing the data package; otherwise, waiting for receiving the audio data, and returning to Step S3 when the audio data is received.

9. The card reader as claimed in claim 8, wherein determining whether the data package is legitimate specifically comprises:

c1, obtaining data of four bytes starting from the first byte of the data package, making the data of four bytes as a frame header, determining whether the frame header is a first preset value, if yes, executing c2; otherwise, the data package is illegitimate;

c2, obtaining data at the seventh byte from the data package, making the data as a parameter flag, and determining whether the parameter flag is legitimate, if yes, executing c3; otherwise, the data package is illegitimate;

c3, obtaining data of two bytes starting from the eighth byte of the data package, making the data of two bytes as data-length-value, and executing c4;

c4, obtaining data whose length equals the data-length-value starting from the tenth byte, making the data as a data field, obtaining data of one byte behind the data field, making the data of one byte as a check word, and executing c5; and c5, calculating the data field via a preset algorithm to obtain a result, comparing the result with the check word, if the result is as same as the check word, the data package is legitimate; if the result is not same as the check word, the data package is illegitimate;

in which, determining whether the parameter flag is legitimate in c2 specifically comprising: determining whether the parameter flag is a second preset value or a third preset value, if yes, the parameter flag is legitimate; otherwise, the parameter flag is illegitimate; or when the data package is legitimate, the step further comprising: determining the parameter flag, parsing the data package in the case that the parameter flag is the second preset value; waiting for receiving data of a preset length in the case that the parameter flag is the third preset value, adding the data of the preset length into the data package, and parsing the current data package.

10. The card reader as claimed in claim 1, wherein, transferring the operation result to the audio data package in Step S4, specifically comprises:

compressing an amplitude voltage of the digital signals of the operation result, transferring the digital signals of the operation result to an analog signal which is similar to a sine wave through a process of charging and discharging slowly, and transferring the analog signal to an audio data package.

11. The card reader as claimed in claim 1, wherein, initializing in Step S1 further comprises: setting a card-slot-state flag as a no-card flag; setting the card-slot-state flag as a card-in flag in the case that a card-in-slot pin is a high level; and setting the card-slot-state flag as the no-card flag in the case that the card-in-slot pin is a low level;

in Step S3, the other instructions comprise: an instruction for inquiring card-slot-state, a powering-on instruction, and powering-off instruction;

in Step S3, determining a type of the instruction according to the parsing result, inquiring a state of the card slot according to the card-slot-state flag in the case that the instruction is the instruction for inquiring card-slot-state, setting card-slot-state data, making the card-slot-state data as the operation result, and executing Step S4;

in the case that the instruction is the powering-on instruction, determining whether there exists a card in the card slot according to the card-slot-state flag, if yes, powering on the card slot, reading a card-slot-powered-on response, making the card-slot-powered-on response as the operation result, and executing Step S4; otherwise, generating a no-card-in-slot response, making the no-card-in-slot response as the operation result, and executing Step S4;

in the case that the instruction is the powering-off instruction, powering off the card slot, reading a card-slot-powered-off response, making the response as the operation result, and executing Step S4;

in Step S5, the other instructions comprise: the instruction for inquiring card-slot-state, the powering-on instruction, and the powering-off instruction;

in Step S5, determining the type of instruction according to the parsing result, in the case that the instruction is the instruction for inquiring card-slot-state, inquiring the state of the card slot according to the card-slot-state flag, setting the card-slot-state data, sending the card-slot-state data to a device which connects to the card reader, and returning to Step S2;

in the case that the instruction is the powering-on instruction, determining whether there exists a card in the card slot according to the card-slot-state flag, if yes, powering on the card slot, reading the card-slot-powered-on response, sending the card-slot-powered-on response to the device which connects to the card reader, and returning to Step S2; otherwise, generating a no-card-in-slot response, and sending the response to the device which connects to the card reader, and returning to Step S2;

in the case that the instruction is the powering-off instruction, powering off the card slot, reading the card-slot-powered-off response, sending the response to the device which connects to the card reader, and returning to Step S2.

12. A card reader, said card reader works with a computer to perform a working method comprising the steps of:

Step W1, powering on a card reader, and initializing the card reader;

Step W2, waiting for receiving data;

Step W3, setting a work mode as a USB mode, and executing Step W4 when USB data is received via a USB channel; setting the work mode as an audio mode, and executing Step W5 when audio data is received via an audio channel;

Step W4, determining an instruction type of the received USB data; sending an operating-card instruction to the card, waiting for receiving an operation result returned by the card, and executing Step W6 if the received USB data is the operating-card instruction; otherwise, executing corresponding operation to obtain an operation result, and executing Step W6;

Step W5, transferring the audio data to digital signals, composing the digital signals to a data package, parsing the data package to obtain a parsing result, and determining a type of the instruction according to the parsing result; waiting for an operation result returned by the card, and executing Step W6 if the instruction is the operating-card instruction, sending the operating-card instruction to the card; executing a corresponding operation to obtain an operation result, and executing Step W6 if the instruction is the other instruction; and Step W6, determining the work mode, sending the operation result to a device which connects to the card reader, and returning to Step W2 in the case that the work mode is a USB mode; transferring the operation result to an audio data package, sending the audio data package to the device which connects to the card reader, and returning to Step W2 in the case that the work mode is an audio mode.

13. The card reader as claimed in claim 12, wherein, before returning to Step W2, Step W6 further comprises:

Step G1, determining whether the USB module is connected to a power supply, if yes, executing Step G2; otherwise, returning to Step W2;

Step G2, determining whether quantity of electric charge of the battery reaches a rating value, if yes, executing Step G3; otherwise, returning to Step W2; and Step G3, prompting over-charging of the battery, returning to Step W2.

14. The card reader as claimed in claim 12, wherein in Step W3, after the USB data is received via a USB channel, and before the work mode is set as the USB mode, the step further comprises: turning off an audio data communication interrupt; or in Step W6, in the case that the work mode is the USB mode, after the operation result is sent to the device connected to the card reader via a USB channel, and before Step W2 is returned to, the step further comprises: turning on the audio data communication interrupt.

15. The card reader as claimed in claim 12, wherein in Step W3, after the audio data is received via an audio channel, and before the work mode is set as the audio mode, the step further comprises: turning off a USB data communication interrupt; or in Step W6, in the case that the woke mode is an audio mode, after the operation result is sent to the device connected to the card reader via the audio channel, and before Step W2 is returned to, the step further comprises: turning on the USB data communication interrupt.

16. The card reader as claimed in claim 12, wherein, Step W2 specifically comprises: determining whether there exists a device which connects to the card reader via the USB module, if yes, waiting for receiving USB data, and executing Step W3; otherwise, determining whether audio data is received in a preset duration, executing Step W3 in the case that the audio data is received in the preset duration; entering a low-power dissipation mode in the case that the audio data is not received in the preset duration; or in Step W3, setting the work mode as the audio mode and executing Step W5 when the audio data is received via the audio channel, specifically comprises: determining whether the work mode is a low-power dissipation mode when the audio data is received via the audio channel, if yes, exiting from the low-power dissipation, and executing Step W5; otherwise, executing Step W5.

17. The card reader as claimed in claim 12, wherein in Step W5, transferring the audio data to a digital signals specifically comprises:

performing, by the card reader, a filtering process on the audio data to obtain a first processed data, performing a blocking process on the first processed data to obtain alternating component from the first processed data; obtaining a second processed data from the alternating component from the alternating component, transferring the second processed data so as to obtain transferred data, and performing the filtering process on the transferred data to obtain the digital signals.

18. The card reader as claimed in claim 12, wherein in Step W5, after composing the digital signals to a data package, and before parsing the data package, the step further comprises: determining whether the data package is legitimate;

in which determining whether the data package is legitimate specifically comprises:

L1, obtaining data of four bytes starting from the first byte of the data package, making the data of four bytes as a frame header, determining whether the frame header is a first preset value, if yes, executing L2; otherwise, the data package is illegitimate;

L2, obtaining data at the seventh byte from the data package, making the data as a parameter flag, and determining whether the parameter flag is legitimate, if yes, executing L3; otherwise, the data package is illegitimate;

L3, obtaining data of two bytes starting from the eighth byte of the data package, making the data of two bytes as a data-length-value, and executing L4;

L4, obtaining data whose length equals the data-length-value starting from the tenth byte, making the data as a data field, obtaining data of one byte behind the data field, making the data of one byte as a check word, and executing L5; and L5, calculating the data field via a preset algorithm to obtain a result, comparing the result with the check word, if the result is as same as the check word, the data package is legitimate; if the result is not same as the check word, the data package is illegitimate;

in which determining whether the parameter is legitimate specifically comprises: the parameter flag is legitimate in the case that the parameter flag is the second preset value or the third preset value; the parameter flag is not legitimate in the case that the parameter is other value; or when the data package is legitimate, determining the parameter flag, parsing the data package in the case that the parameter flag is the second preset value; waiting for receiving data of a preset length, adding the data into the data package, and then parsing the data package in the case that the parameter flag is the third preset value.

19. The card reader as claimed in claim 12, wherein in Step W6, transferring the operation result to an audio data package, specifically comprises:

compressing an amplitude voltage of the digital signals of the operation result, transferring the digital signals of the operation result to an analog signal which is similar to a sine wave through a process of charging and discharging slowly, and transferring the analog signal to an audio data package.

20. The card reader as claimed in claim 12, wherein, initializing in Step W1 further comprises: setting a card-slot-state flag as a no-card flag; setting the card-slot-state flag as a card-in flag in the case that a card-in-slot pin is a high electric level; setting the card-slot-state flag as the no-card flag in the case that the card-in-slot pin is a low electric level;

in Step W4, the other instructions comprise: an instruction for inquiring card-slot-state, a powering-on instruction, and powering-off instruction;

in Step W4, determining a type of the received USB data, inquiring a state of the card slot according to the card-slot-state flag in the case that the instruction is the instruction for inquiring card-slot-state, setting card-slot-state data, making the card-slot-state data as the operation result, and executing Step W6;

in the case that the instruction is the powering-on instruction, determining whether there exists a card in the card slot according to the card-slot-state flag, if yes, powering on the card slot, reading a card-slot-powered-on response, making the card-slot-powered-on response as the operation result, and executing Step W6; otherwise, generating a no-card-in-slot response, making the no-card-in-slot response as the operation result, and executing Step W6;

in the case that the instruction is the powering-off instruction, powering off the card slot, reading a card-slot-powered-off response, making the response as the operation result, and executing Step W6; and in Step W5, the other instructions comprise: the instruction for inquiring card-slot-state, the powering-on instruction, and the powering-off instruction;

determining the type of instruction according to the parsing result, in the case that the instruction is the instruction for inquiring card-slot-state, inquiring the state of the card slot according to the card-slot-state flag, setting the card-slot-state data, making the card-slot-state data as an operation result, and executing Step W6;

in the case that the instruction is the powering-on instruction, determining whether there exists a card in the card slot according to the card-slot-state flag, if yes, powering on the card slot, reading a card-slot-powered-on response, making the card-slot-powered-on response as an operation result, and executing Step W6; otherwise, generating a no-card-in-slot response, and making the no-card-slot response as an operation result, and executing Step W6;

in the case that the instruction is the powering-off instruction, powering off the card slot, reading a card-slot-powered-off response, making the response as an operation result, and executing Step W6.

* * * * *